(12) United States Patent
Razavi Majomard et al.

(10) Patent No.: US 10,868,580 B1
(45) Date of Patent: Dec. 15, 2020

(54) ETHERNET LINK TRANSMIT POWER METHOD BASED ON ALIEN CROSSTALK FEEDBACK

(71) Applicant: Aquantia Corporation, San Jose, CA (US)

(72) Inventors: Seid Alireza Razavi Majomard, San Carlos, CA (US); David Shen, Saratoga, CA (US); KongHoei Susanto Lim, San Jose, CA (US)

(73) Assignee: Marvell Asia Pte., LTD., Singapore (SG)

( * ) Notice: Subject to any disclaimer, the term of this patent is extended or adjusted under 35 U.S.C. 154(b) by 0 days.

(21) Appl. No.: 16/554,000

(22) Filed: Aug. 28, 2019

(51) Int. Cl.
  *H04B 3/32* (2006.01)
  *H04B 3/487* (2015.01)
  *H04L 1/00* (2006.01)
  *H04B 1/40* (2015.01)

(52) U.S. Cl.
  CPC .............. *H04B 3/32* (2013.01); *H04B 1/40* (2013.01); *H04B 3/487* (2015.01); *H04L 1/0061* (2013.01)

(58) Field of Classification Search
  CPC .. H04B 3/32; H04B 1/40; H04B 3/487; H04L 1/0061
  See application file for complete search history.

(56) References Cited

U.S. PATENT DOCUMENTS

| 7,388,909 | B2 * | 6/2008 | Lin ................... H04L 25/03146 375/222 |
| 8,804,798 | B2 * | 8/2014 | Malkin ............. H04L 25/03878 375/222 |
| 9,742,465 | B1 * | 8/2017 | Sedarat ................. H04B 3/487 |
| 9,893,756 | B1 * | 2/2018 | Sedarat .................... H04B 1/40 |
| 2007/0192505 | A1 * | 8/2007 | Dalmia ................. H04L 5/1446 709/233 |
| 2007/0258514 | A1 * | 11/2007 | Wajcer .................. H04M 3/002 375/222 |
| 2008/0225879 | A1 * | 9/2008 | Powell .................. H04L 12/413 370/445 |
| 2009/0097393 | A1 * | 4/2009 | Diab ........................ H04B 3/32 370/201 |
| 2009/0161803 | A1 * | 6/2009 | Huang ................. H03G 3/3068 375/345 |
| 2016/0308742 | A1 * | 10/2016 | Bains ..................... H04B 3/487 |
| 2018/0026917 | A1 * | 1/2018 | Ran ..................... H04L 49/3054 709/228 |

\* cited by examiner

*Primary Examiner* — Kenneth T Lam

(57) ABSTRACT

A method of operating an Ethernet transceiver includes initializing the Ethernet transceiver during a training mode of operation by transmitting training data to a link partner at a first data rate and at a first transmit power level. The data rate and/or transmit power level is adjusted to an adjusted second data rate and/or second transmit power level based on feedback representing alien crosstalk effects to neighboring Ethernet links caused by the transmitting. A normal data transfer mode of operation is initialized utilizing the adjusted second data rate and/or transmit power level.

20 Claims, 9 Drawing Sheets

ETHERNET LINK TRANSMIT POWER METHOD BASED ON ALIEN CROSSTALK FEEDBACK

TECHNICAL FIELD

The disclosure herein relates to electronic communications, and more particularly to mitigating interference in signals transmitted over communication channels.

BACKGROUND

Communication systems are widely used in computer and device networks to communicate information between computers and other electronic devices. Transceivers of a communication system send and receive data over a link (including one or more channels) of a communication network to communicate with other transceivers. A transceiver includes a transmitter for sending information across a link, and a receiver for receiving information from a link. The receiver detects transmitted data on the link and converts the data into a form usable by the system connected to the transceiver. For example, one widely-used network communication standard is Ethernet, including several different standards for different network bandwidths, including 10GBASE-T allowing 10 gigabit/second connections over unshielded or shielded twisted pair cables. A similar standard, NBASE-T, provides for reduced data rates on the order of 1 Gbps, 2.5 Gbps, 5 Gbps and 10 Gbps.

There are multiple sources of impairment and interference in a 10GBASE-T system which can cause significant performance degradation. These sources of impairment and interference can be broadly categorized as internal and external sources. The internal sources are often caused by the link-partners themselves and imperfect channel characteristics. Examples of these sources are inter-symbol interference (ISI), echo and pair-to-pair cross-talk such as far-end crosstalk (FEXT) and near-end crosstalk (NEXT). Such noise sources are typically known to the link partners and thus can often be cancelled effectively with cancellers and equalizers.

Another type of impairment in 10GBASE-T systems is interference from sources external to a particular link. Examples of external interfering sources, referred to herein as alien interferers, include adjacent cross-talking Ethernet ports/links, where the noise source is from a different port or cable that is adjacent to the subject link (port). In such circumstances, the source of the interference is unknown to the subject link, and is a greater challenge to reduce than noise originating from a known source such as ISI, echo, FEXT, and NEXT.

When adding new Ethernet links, conventional standards typically provide for transmit power settings based on the received signal power from the other side of the link which is a function of the length of the link. No provisions are generally made for any alien crosstalk effects the new link may have on existing links. Accordingly, what is needed are systems and methods that minimize any alien interference impact to existing Ethernet links due to expansion of one or more a networks to include new links.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of Ethernet networks, links, transceivers and associated operating methods are disclosed. For one embodiment, a method of operating an Ethernet transceiver includes initializing the Ethernet transceiver during a training mode of operation by transmitting training data to a link partner at a first data rate and at a first transmit power level. The data rate and/or transmit power level is adjusted to an adjusted second data rate and/or second transmit power level based on feedback representing alien crosstalk effects to neighboring Ethernet links caused by the transmitting. A normal data transfer mode of operation is initialized utilizing the adjusted second data rate and/or transmit power level.

Figure 1:
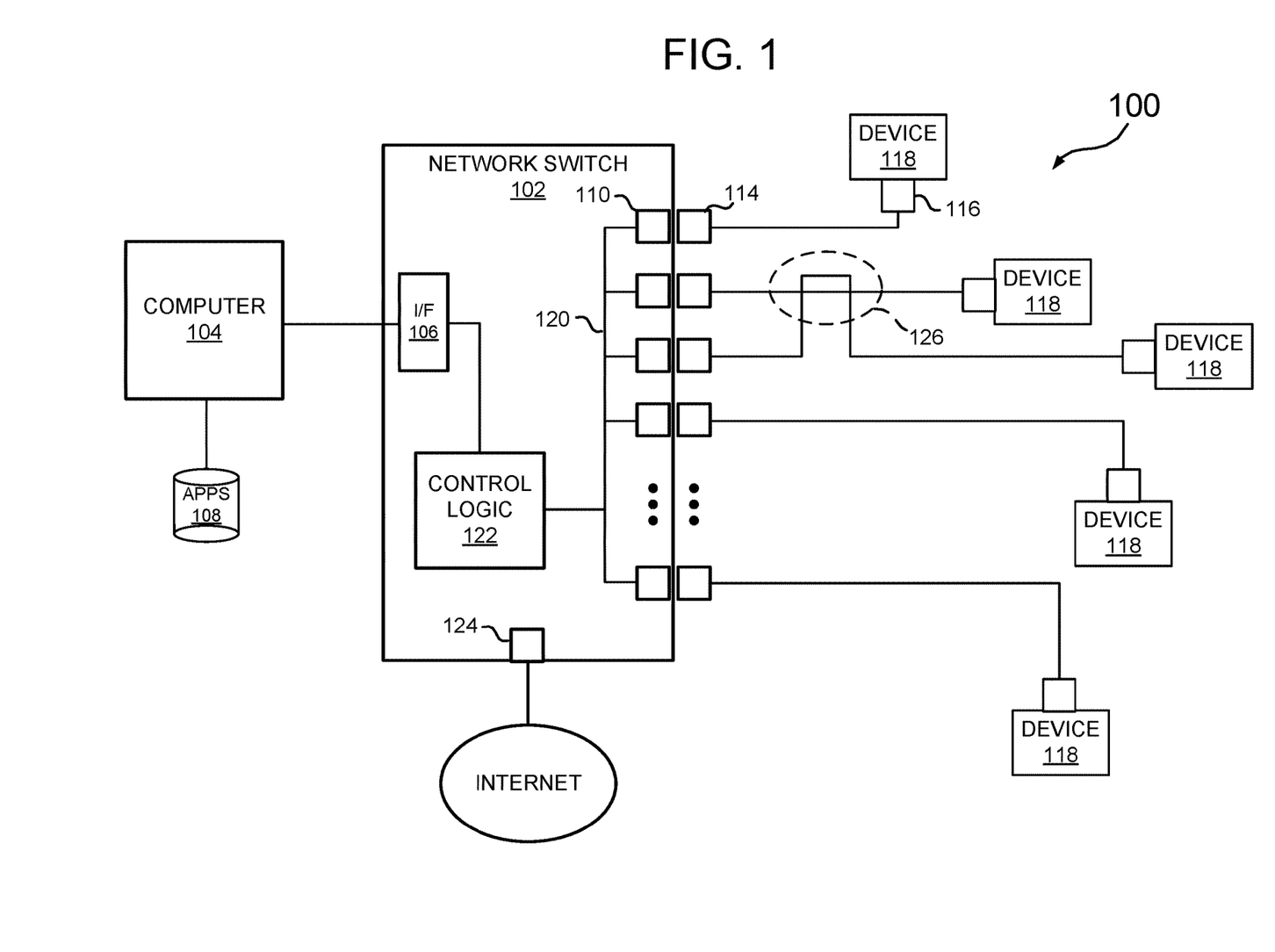
FIG. 1 illustrates one embodiment of an Ethernet network architecture.

FIG. 1 illustrates one embodiment of an Ethernet network architecture, generally designated 100. A network device such as a network switch 102 interfaces with a general purpose computer 104 via an interface circuit 106. The computer may be local to the network, or remote, such that the network switch may be controlled via Information Technology (IT) personnel. For one embodiment, the computer executes instructions associated with network applications, including diagnostics software, that are stored in memory 108. The diagnostics software provides a methodology for the network switch to carry out diagnostic processes involving, for example, crosstalk and transmit power determinations, more fully described below.

Further referring to FIG. 1, in one embodiment, the network switch 102 includes multiple Ethernet ports 110 corresponding to individual Ethernet links. The network switch may include, for example, forty-eight or more Ethernet ports to support an equal number of links. Each port connects to a local end 112 of an Ethernet cable 114. The remote end 116 of each cable connects to a network device 118, such as a computer, network printer, access node, or the like. Further details regarding each Ethernet link are described below with respect to FIG. 2.

With continued reference to FIG. 1, for one embodiment, each Ethernet port 110 on the network switch 102 communicates to every other port via a signal bus 120. Control logic 122 on the network switch couples to the signal bus 120, and manages coordination between the circuits associated with each port. The network switch may also include an Internet port 124 that provides Internet access to the various Ethernet links.

Figure 2:
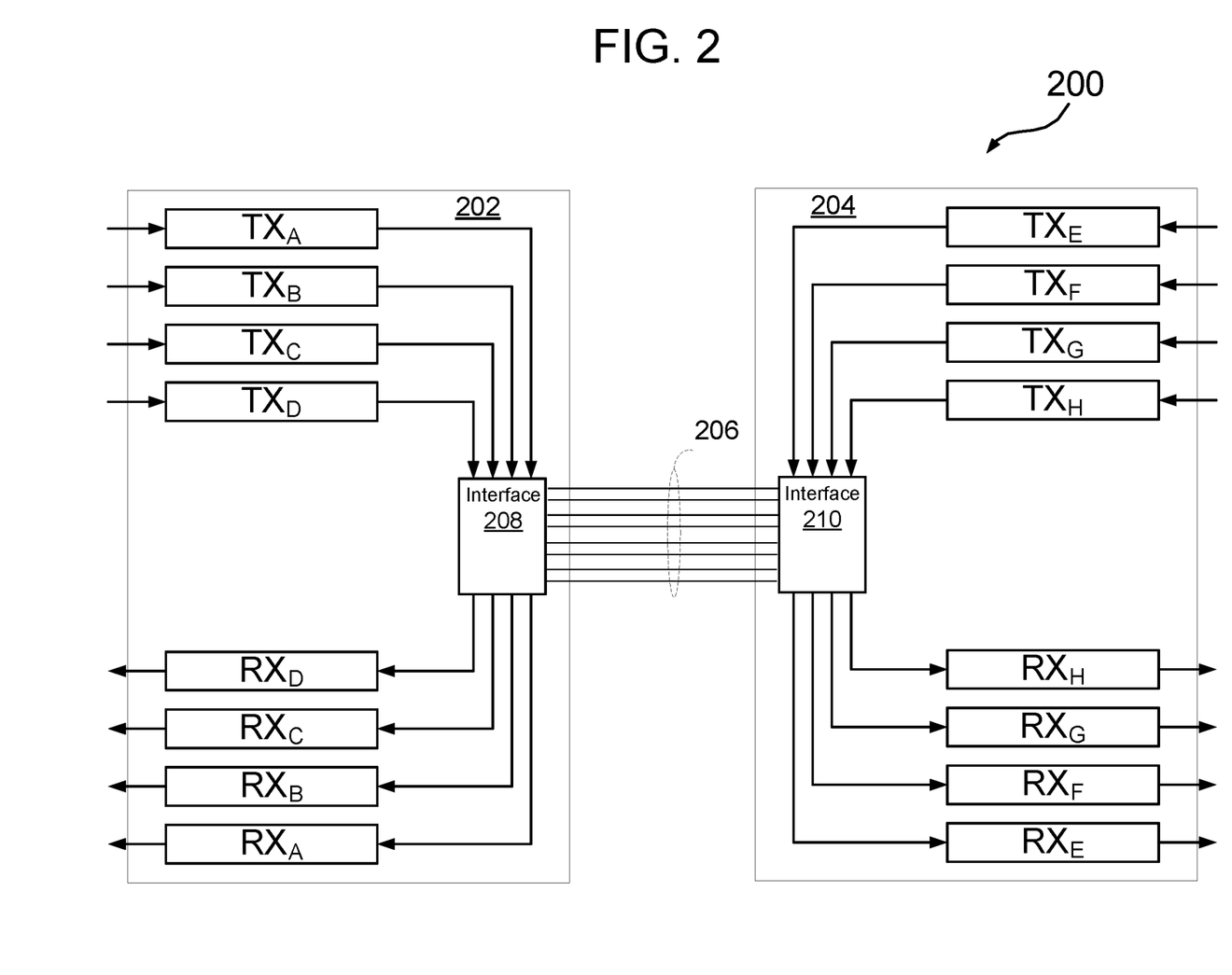
FIG. 2 illustrates one embodiment of an Ethernet link that may be used in the network architecture of FIG. 1.

FIG. 2 is a block diagram illustrating one embodiment of an Ethernet link that may be employed in the network of FIG. 1. The link includes a first transceiver integrated circuit (IC) or chip 202 and a second transceiver chip 204 that can communicate with each other. The first transceiver 202 includes "transceiver components" including one or more transmitters $TX_A$-$TX_D$ and one or more receivers $RX_A$-$RX_D$. Similarly, the second transceiver 204 includes various transceiver components including one or more transmitters $TX_E$-$TX_H$ and one or more receivers $RX_E$-$RX_H$. The transmitters $TX_A$-$TX_H$ shown in FIG. 2 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" (such as the network switch of FIG. 1) associated with each respective transceiver which wants to communicate data over the communication network. For example, the transmitters receive data and control signals from the controller connected to the first transceiver 202 in order to send the data over the network to other transceivers and controllers, while the receivers receive data from other transceivers and controllers via the network in order to provide the data to the controller connected to the first transceiver 202.

The first transceiver chip 202 can communicate with the second transceiver chip 204 over one or more communication channels of a communication link 206. In one embodiment, such as one similar to the 10GBASE-T Ethernet standard, four communication channels are provided on the communication link 206, each channel including a twisted pair cable. Thus, in that standard, there are four transmitters TX and four corresponding receivers RX provided in each of the transceivers 202 and 204, each transmitter associated with one of the local near-end receivers in the same transceiver, and each such transmitter/receiver pair dedicated to one channel used for duplex communication. A transmitter/receiver pair in the first transceiver 202 communicates across a channel of the link 206 to a far-end transmitter/receiver pair in the second transceiver 204. A transmitter TX and a receiver RX that are connected to the same channel/link, or two transceivers connected by the communication link 206, are considered "link partners."

An interface 208 can be provided in the first transceiver chip 202 and an interface 210 can be provided in the second transceiver chip 204 to allow data transmissions between the transceivers to be routed to the appropriate transceiver blocks. For example, the interfaces 208 and 210 can include transformers, and circuitry used for directing signals or data (alternatively, some or all circuitry can be included in other components, such as transmitters TX and receivers RX).

In one example, from the point of view of the first transceiver chip 202, data transmissions during a normal or regular operation mode from a local transmitter TX are provided to the interface 208, which outputs the data on a corresponding channel of the communication link 206. The data is received by the link partner, the second transceiver chip 204. The interface 210 of the transceiver 204 provides the received data to its receiver RX connected to that same channel. Furthermore, due to noise effects such as near-end crosstalk and echo, the data transmitted by the transmitters is also received by the near-end receivers in the same transceiver. Echo and crosstalk filters may be used to filter out this noise so that the receivers receive only data from other transceivers. In virtually all real scenarios, the data transmitted by a local transmitter has no dependence or relation with data being received by the corresponding local receiver.

In many instances, enterprise applications that employ the channel architecture of FIG. 2 utilize thousands of such deployments, resulting in complex crosstalk environments. For instance, in many circumstances such as the network of FIG. 1, a commercial building or residence employs existing Ethernet cable throughout various walls and ceilings in order to establish each link from a given remote location in the building (such as a switch plate in a given office), to the centralized location of the network switch. The original routing of the cables may be such that one or more newly added cables may cause alien crosstalk interference affecting one or more of the previously installed original cables. This is shown in FIG. 1, at 126.

The Ethernet links of FIG. 2, which are employed in the network of FIG. 1 operate at very high data rates, as high as 10 Gbps. Links that are exposed to alien crosstalk may not be able to operate at such high data rates, and may need to have their data rates reduced in order to have an acceptable signal-to-noise ratio (SNR) for data transfers. Such a situation is undesirable when installing new links.

Figure 3:
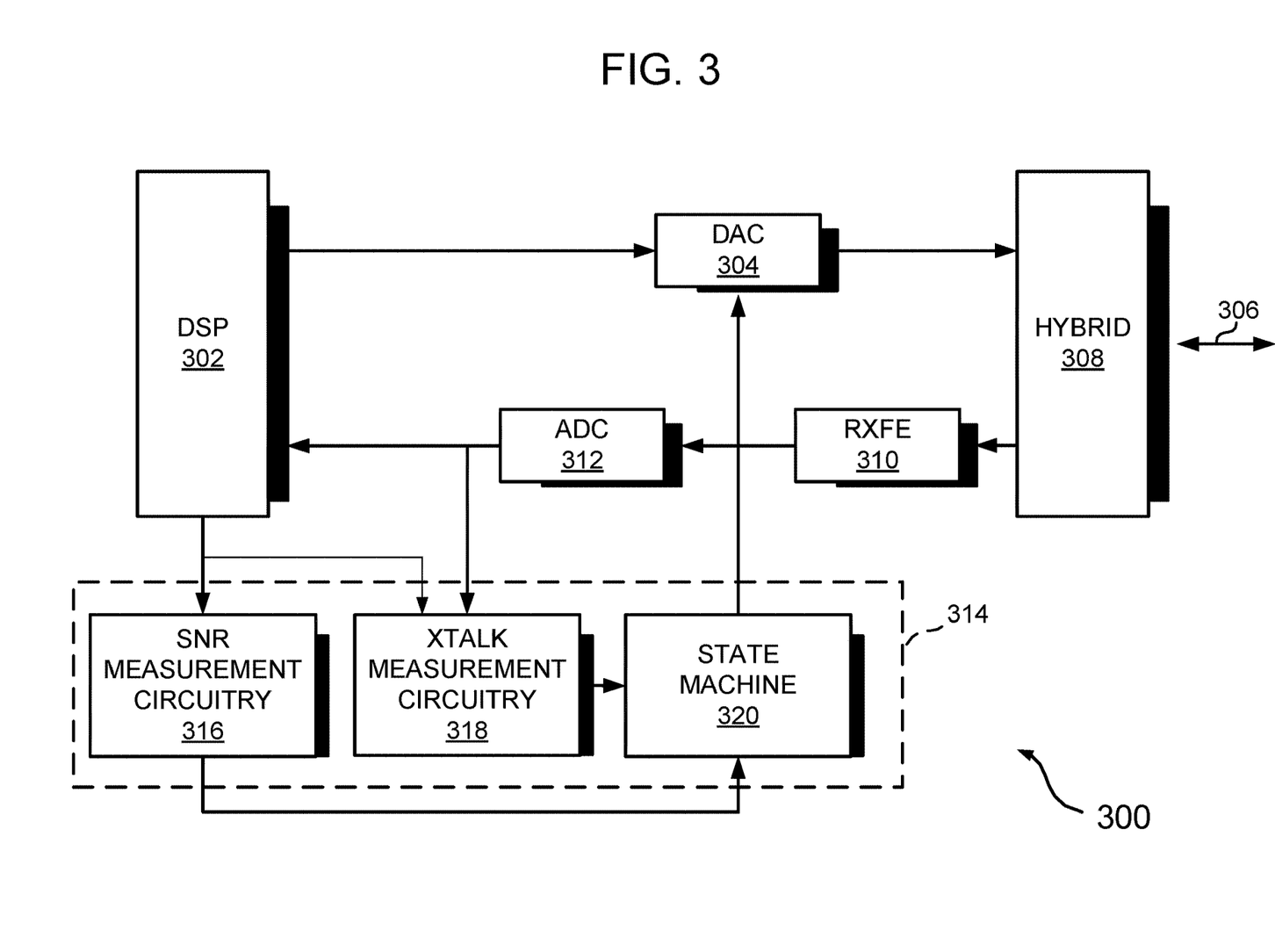
FIG. 3 illustrates a block diagram for one embodiment of an Ethernet PHY architecture.

FIG. 3 is a block diagram of one embodiment of an Ethernet physical circuit (PHY) architecture that minimizes the impact of crosstalk to neighboring links as a new link is installed for service in a given network. The PHY architecture, generally designated 300, is employed for each of the transmit/receive channels of each end of the link shown in FIG. 2. The PHY includes a digital signal processor DSP 302 that includes various adaptive filters that may be trained during training modes of operation to generate filter coefficients for minimizing near-end and far-end crosstalk, as well as echo effects along the link. For one embodiment, the DSP may include an input to receive parameter information relating to other links coupled to the network device or switch (such as switch 102 in FIG. 1). Along a transmit path of the PHY, a digital-to-analog converter (DAC) 304 acts as a transmit driver and generates analog output signals for transmission along a transmission line 306 via hybrid circuitry 308. A receive path of the PHY includes a receiver front end circuit 310 that receives incoming signals via the hybrid circuit 306, and provides the received signals to an analog-to-digital converter (ADC) 312. The digitized signals are then fed to the DSP for filtering, equalization, and so forth.

For situations involving installation of a new link into an existing network, one embodiment of the PHY architecture employs training logic in the form of alien performance detection circuitry 314 to generate feedback relating to any effects on other links arising from operation of the new link. The alien performance detection circuitry may include signal-to-noise ratio (SNR) measurement circuitry 316 to determine respective SNR values for one or more adjacent links to the new link, and cross talk measurement circuitry 318. The crosstalk measurement circuitry detects crosstalk effects to adjacent links, and can compare the detected crosstalk to a pre-programmed threshold level or to previously detected levels of crosstalk. Crosstalk information may be fed to the crosstalk measurement circuitry from the output of the ADC 312 and/or the DSP 302. The DSP may be able to provide crosstalk information in situations where echo from transmission may hide alien crosstalk information that might otherwise be available from the ADC 312. Measurements made by the SNR measurement circuitry 316 and/or the cross-talk measurement circuitry 318 may be fed to a control state machine 320. As explained in further detail below, the control state machine provides transmit power adjustments and/or data rate adjustments to the transmit DAC 304 based on the detected feedback, thus optimizing any adverse effects to existing links from the newly installed link.

Figure 4:
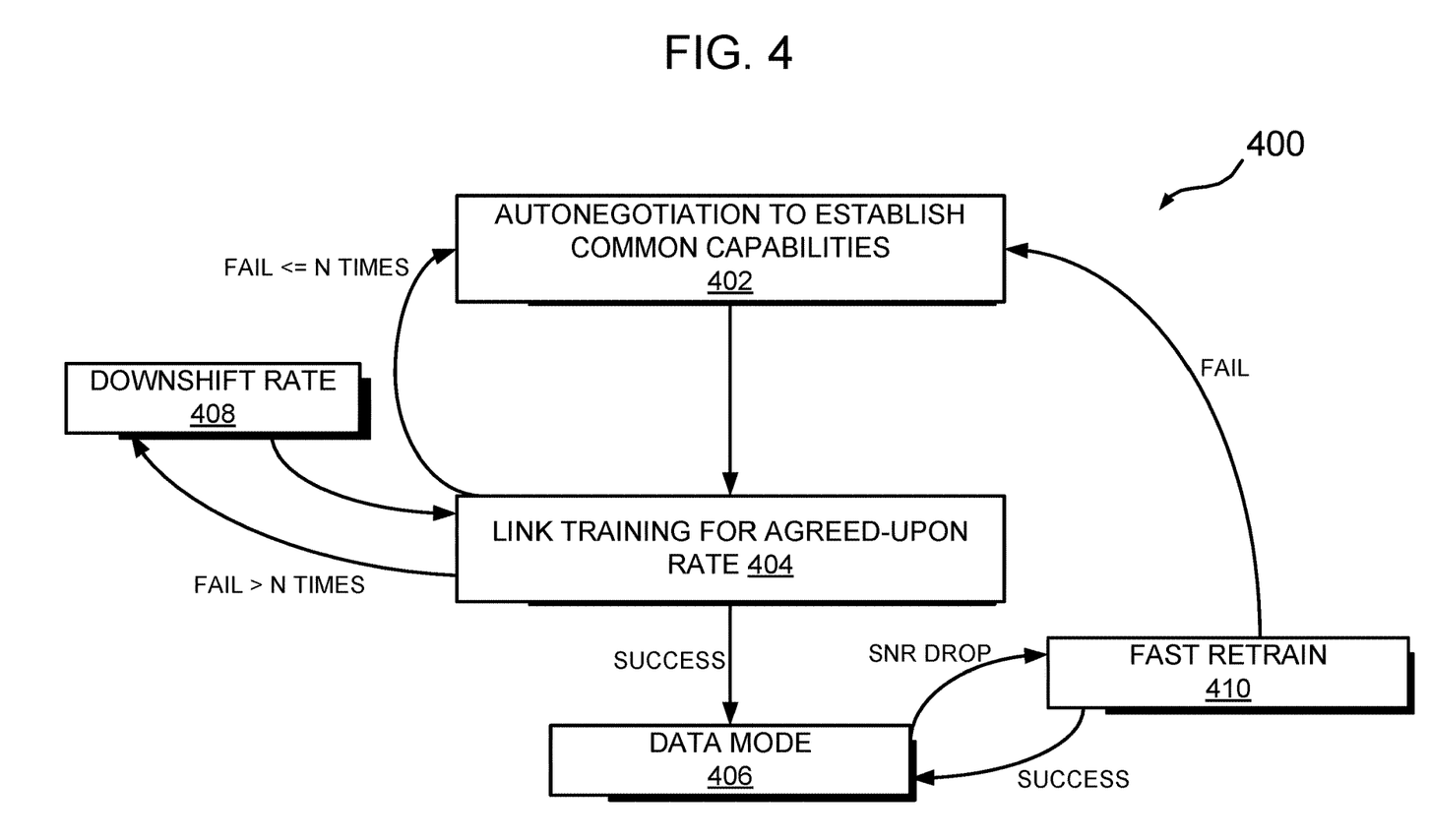
FIG. 4 illustrates a state diagram for one embodiment of a generalized method of operating an Ethernet link through various autonegotiation, training, and normal data operating modes.

To more fully understand the methods described below, it's helpful to understand a few basic operating modes for all of the links of a given network. FIG. 4 is a state diagram illustrating one example of operating an Ethernet link, generally designated 400. This example is suitable for NBASE-T and/or 10GBASE-T Ethernet standards, but other different configurations and types of transceiver components can be used in other embodiments for other, different communication standards. Bringing up a given link generally begins with an autonegotiation step, at 402, where the link partners communicate with each other using a low-speed and low data rate protocol to advertise common capabilities. Such capabilities might involve rate downshifting, initial transmit power levels, and a commonly agreed-upon starting data rate. Following autonegotiation, the link begins a training step, at 404, to transfer data between the link partners at the agreed-upon transmit power level and data rate to generate a certain level of filter adaptations. If the training mode is successful, then the link enters a normal data mode of operation, shown at 406.

With continued reference to FIG. 4, should the link training mode fail less than a predetermined threshold number of times N, then the autonegotiation step is restarted, at 402, followed by another link training step, at 404. If the link continues to fail more than the threshold allowed, then the data rate may be reduced, at 408, and the link returned to the autonegotiation mode 402 again. The threshold level N may be programmable and based on the time allowed for autonegotiation operations, training operations, and so forth.

In the event the link passes training, operates successfully for a given period of time, then fails for some unknown reason, then a fast retrain may take place, at 410, to restore the link to the normal data operating mode. A fast retrain generally involves far fewer training steps to return the link to normal operation as compared to a full training sequence. In some embodiments, the fast retrain may be associated with a quiet period or other signature that may be detectable by other PHY's in the network. In some circumstances, a fast retrain may not work to restore the link to a data operating mode. If this occurs, the link may return to the autonegotiation mode 402 to re-initialize itself.

The general operating mode steps described above may be carried out at any time by any of the links operating in the network. Further, whether a given link is undergoing training or a fast retrain may be detectable by any other PHY, and/or the network switch due to the unique signatures associated with full training sequences and fast retrain sequences. For example, if the alien crosstalk measurement shows that there is a pause in crosstalk for a predetermined amount of time before the crosstalk begins again, it may indicate a fast retrain.

Figure 5:
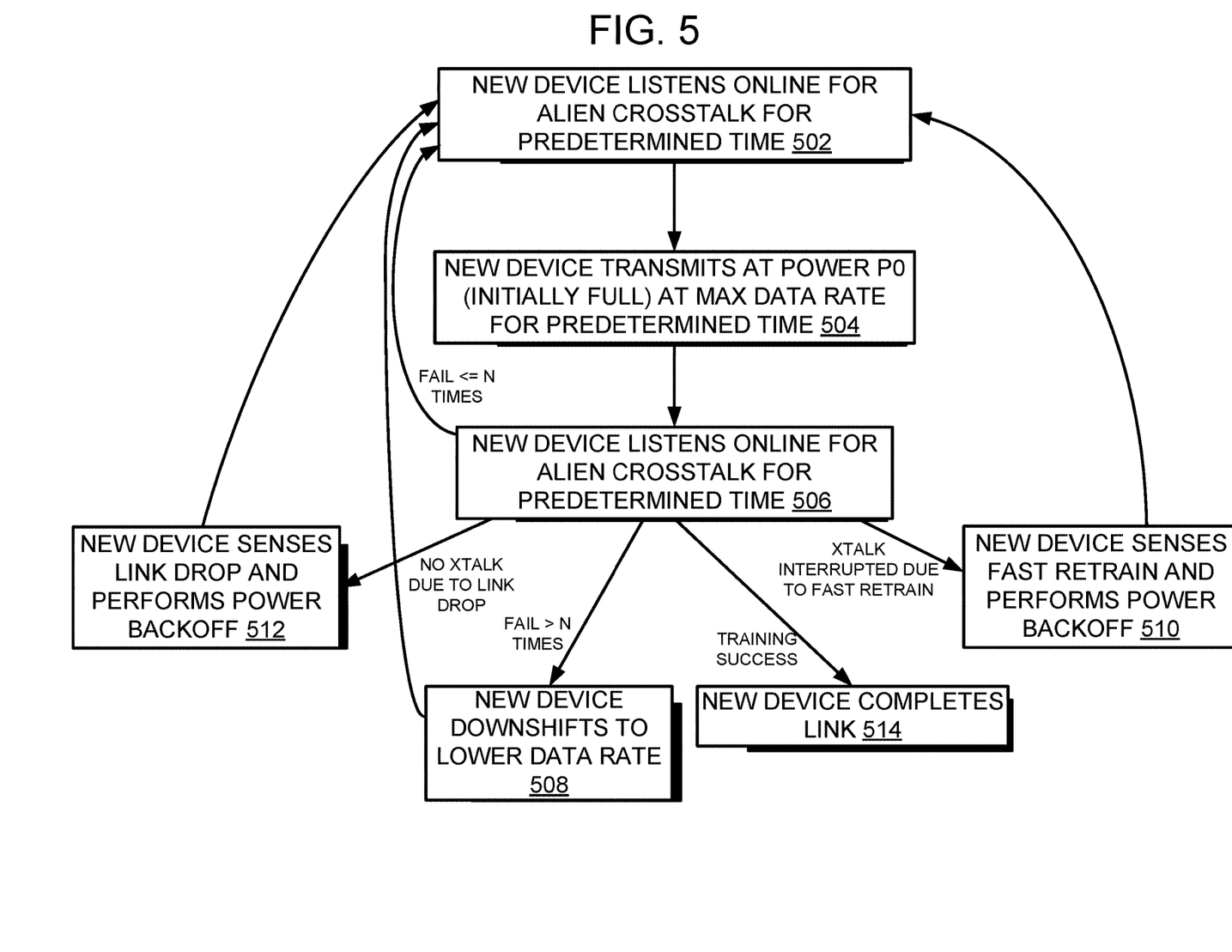
FIG. 5 illustrates a state diagram for one embodiment of a method of establishing a link transmit power setting based on feedback from neighboring links as detected by a newly installed Ethernet PHY.

Referring now to FIG. 5, one embodiment of a transmit power method based on alien link parameters involves generating transmit power and/or data rate adjustments for a new link based on feedback from the alien crosstalk measurement circuit 314. Different embodiments are described below that approach the training of a new link in different ways.

Further referring to FIG. 5, a first embodiment of the transmit power method takes place during the previously-described training mode of operation. With a given PHY in the training mode, it listens online for alien crosstalk information for a predetermined amount of time to set a baseline alien crosstalk value, at 502. The PHY then transmits training data at a maximum transmit power level of P0 and at a maximum data rate, at 504. Following the training data transmission, the PHY listens online again for any changes in the baseline alien crosstalk for a predetermined time, at 506. If there is a basic training failure associated with the new link, then the process reverts back to the initial training step at 502. If the basic training failures occur more than a predetermined threshold number of times, then the state machine may direct the PHY and link partner to operate at a lower data rate, at 508.

At this point, assuming no training failure, and further referring to FIG. 5, the SNR measurement circuitry 316 (FIG. 3) and/or crosstalk measurement circuitry 318 (FIG. 3) in the PHY may or may not detect changes in SNR and/or crosstalk. The control state machine may then make one or more of the following adjustments based on any detected SNR or crosstalk. For example, the crosstalk measurement circuitry may detect any one of a number of signatures indicating that one or more links may be carrying out a fast retrain (such as by detecting a "pause", or tone, or other indicator of a fast retrain). The state machine then may dial-down the transmit power to a level incrementally lower than the previous level, at 510, and the process reverts back to the initial training step, at 502. In a similar manner, the alien performance detection circuitry may detect that an existing link has completely dropped, due to, for example, no baseline level of crosstalk such as detected earlier. In such a circumstance, the state machine may direct the transmit DAC circuitry to operate at a lower transmit power, at 512, and the new link training starts again at the first step 502. At some point, the new device completes training of the link, at 514, with an optimized data rate and transmit power level that is not only optimal for the newly installed link, but has little to no effects on the surrounding links, thereby reducing the risk that the other links may downshift to lower data rates and stay there.

Figure 6:
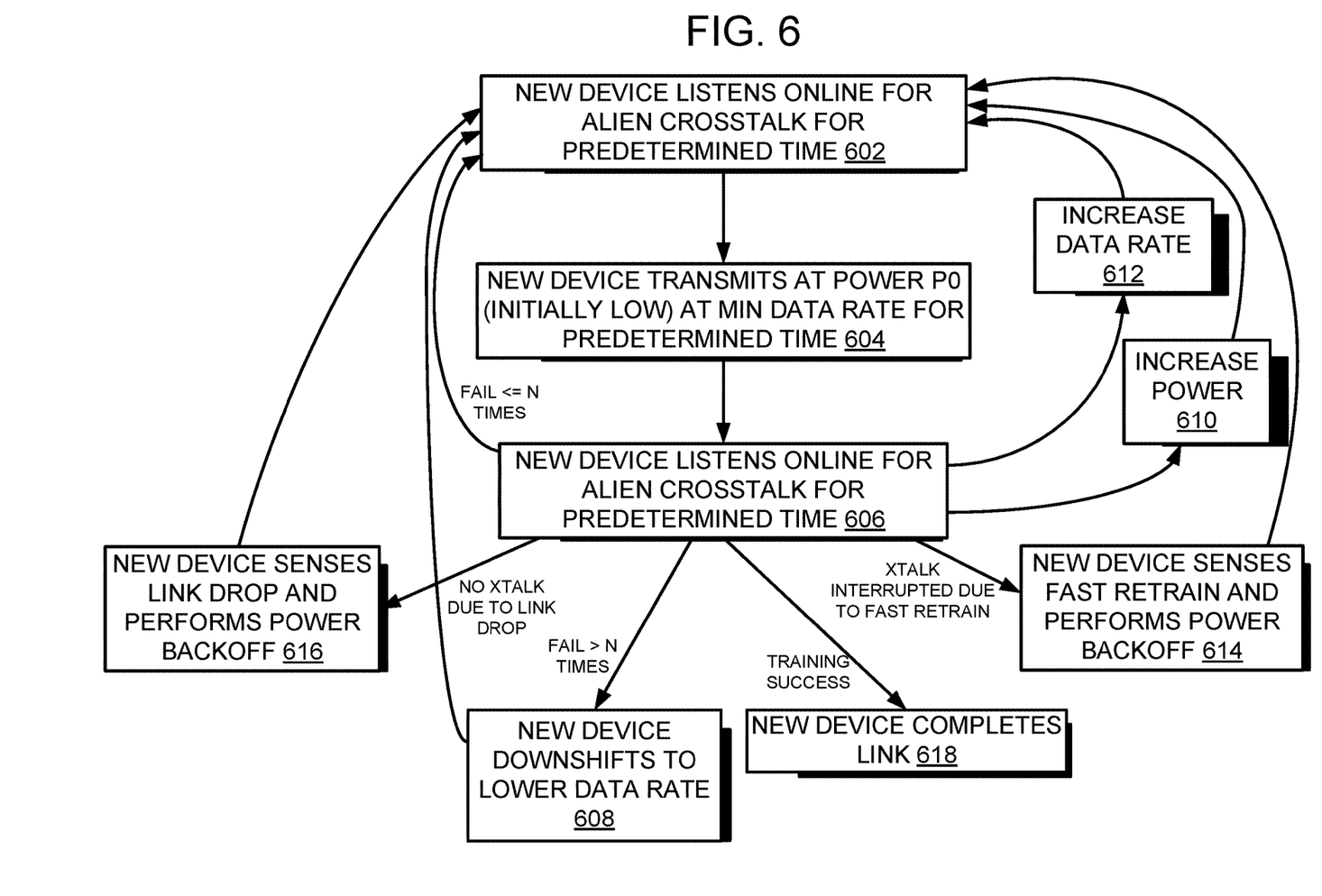
FIG. 6 illustrates a state diagram for an alternative embodiment for establishing a link transmit power setting similar to FIG. 5.

FIG. 6 illustrates a state diagram similar to the one shown in FIG. 5, corresponding to a method of setting a transmit power level and data rate, but where the initial data rate and transmit power level are at a minimum level. With a given PHY in the training mode, it listens online for alien crosstalk information for a predetermined amount of time to set a baseline alien crosstalk value, at 602. The PHY then transmits training data at a minimum transmit power level of P0 and at a minimum data rate of R0, at 604. Following the training data transmission, the PHY listens online again for any changes in the baseline alien crosstalk for a predetermined time, at 606. If there is a basic training failure associated with the new link that occurs less than a predetermined number of time N, then the process reverts back to the initial training step at 602. If the basic training failures occur more than "N" time, then the state machine may direct the transmit DAC to operate at an even lower data rate than R0, at 608.

Further referring to FIG. 6, should the initial training steps succeed, then the initial power backoff level and/or data rate may be increased, at 610 and 612, and the alien crosstalk detection steps repeated, at 602-606. These steps may iterate several times until either the training steps fail for the link in training, or a change in cross talk or SNR is detected in any of the other links. For example, the crosstalk measurement circuitry may detect any one of the signatures described above indicating that one or more of the existing links may be carrying out a fast retrain (such as by detecting a "pause", or tone, or other indicator of a fast retrain). The state machine then may dial-down the transmit power to a level incrementally lower than the previous level, at 614, and the process reverts back to the initial training step, at 602. In a similar manner, the alien performance detection circuitry may detect that an existing link has completely dropped, due to, for example, no baseline level of crosstalk such as detected earlier. In such a circumstance, the state machine may direct the transmit DAC circuitry to operate at a lower transmit power, at 616, and the new link training starts again at the first step 602.

With continued reference to FIG. 6, at some point, the iterative steps described above lead to a state where training succeeds at a highest power and data rate without a power or rate backoff. At that state, the new link may exit the training mode of operation and enter the normal data mode of operation, at 618.

The embodiments of FIG. 5 and FIG. 6 thus provide a mechanism for an Ethernet PHY to detect feedback associated with crosstalk and/or SNR effects on adjacent links caused by operation of a new link. While beneficial in many circumstances, there may be scenarios where the PHY architecture may not include SNR measurement circuitry or crosstalk measurement circuitry. Embodiments described below relating to FIGS. 7-10 address situations where information associated with existing links in a network provided by a service provider (such as via a network device or switch) may serve as feedback that the PHY can use to adjust transmit power and data rates for a new link in a manner that minimizes the operational impact to existing links.

Figure 7:
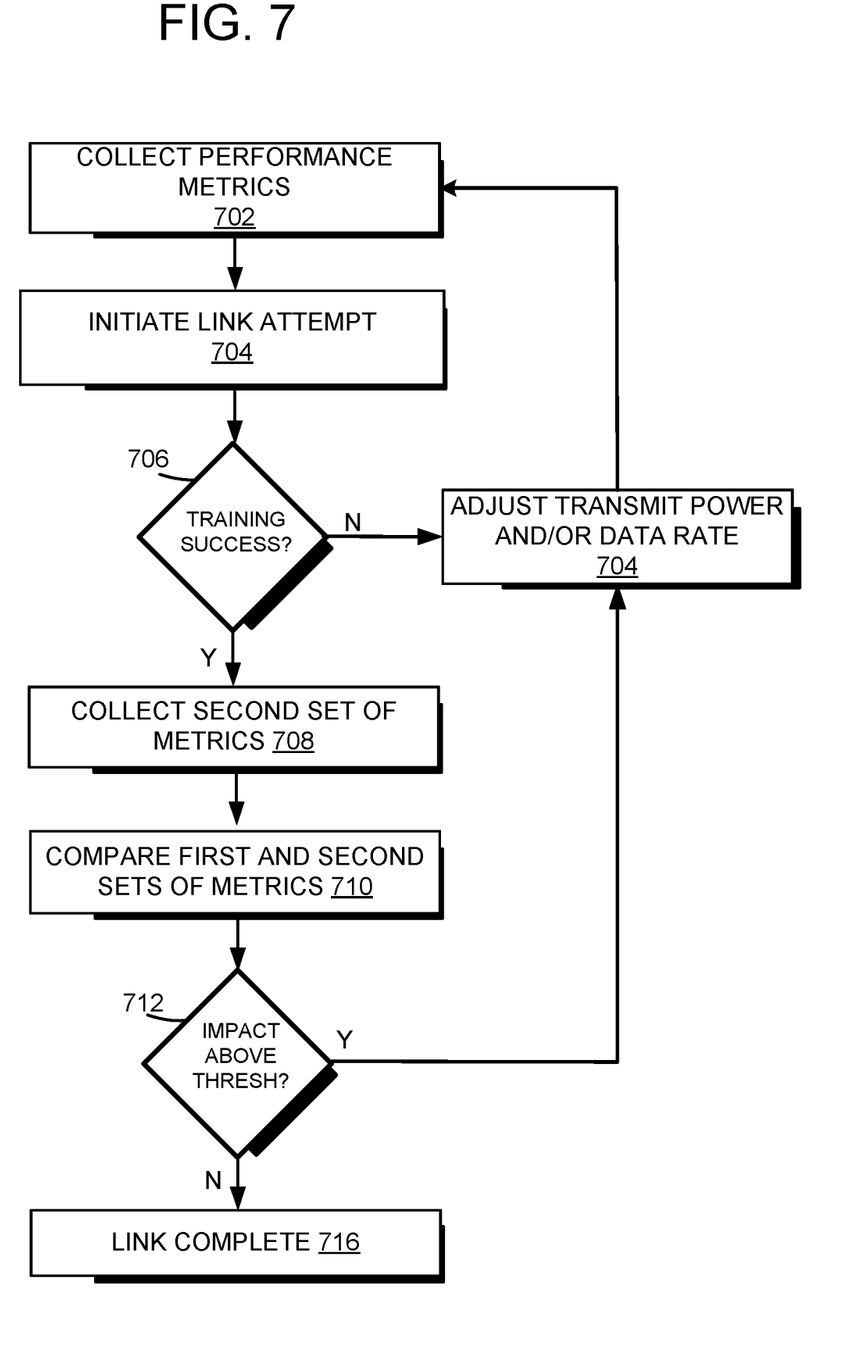
FIG. 7 illustrates a flowchart for a further embodiment of a method of establishing a link transmit power setting based on feedback collected by a network device.

Referring now to FIG. 7, one embodiment of a link test method utilizing feedback from a service provider involves first collecting a first set of various performance metrics of known neighboring channels, at 702. This may be straightforwardly carried out where adjacent links each terminate locally in a common network device or switch. The performance metrics may include baseline values of packet errors, average LDPC values, LDPC iteration counts, LDPC/CRC errors, SNR margins, power backoff levels, and so forth. At 704, a link attempt is initiated at a highest target line rate for the new link. If the training is successful, at 706, then a second set of the performance metrics is collected, at 708, and compared to the first set of performance metrics, at 710. The method is completed, at 716, if the training for the new link is successful (at 706), and any impacts to neighboring links are less than a predetermined threshold, at 712. If the training is not successful (at 706), or the impacts to other links are above the threshold (at 712), then the process repeats, albeit with the Ethernet PHY adjusted to transmit data at a lower data rate and/or transmit power level, at 714.

The embodiment of FIG. 7 may be carried out quickly, and on the network switch side with little involvement from the Ethernet PHY. As a result, the Ethernet PHY may be either of a standardized design, or proprietary design.

Figure 8:
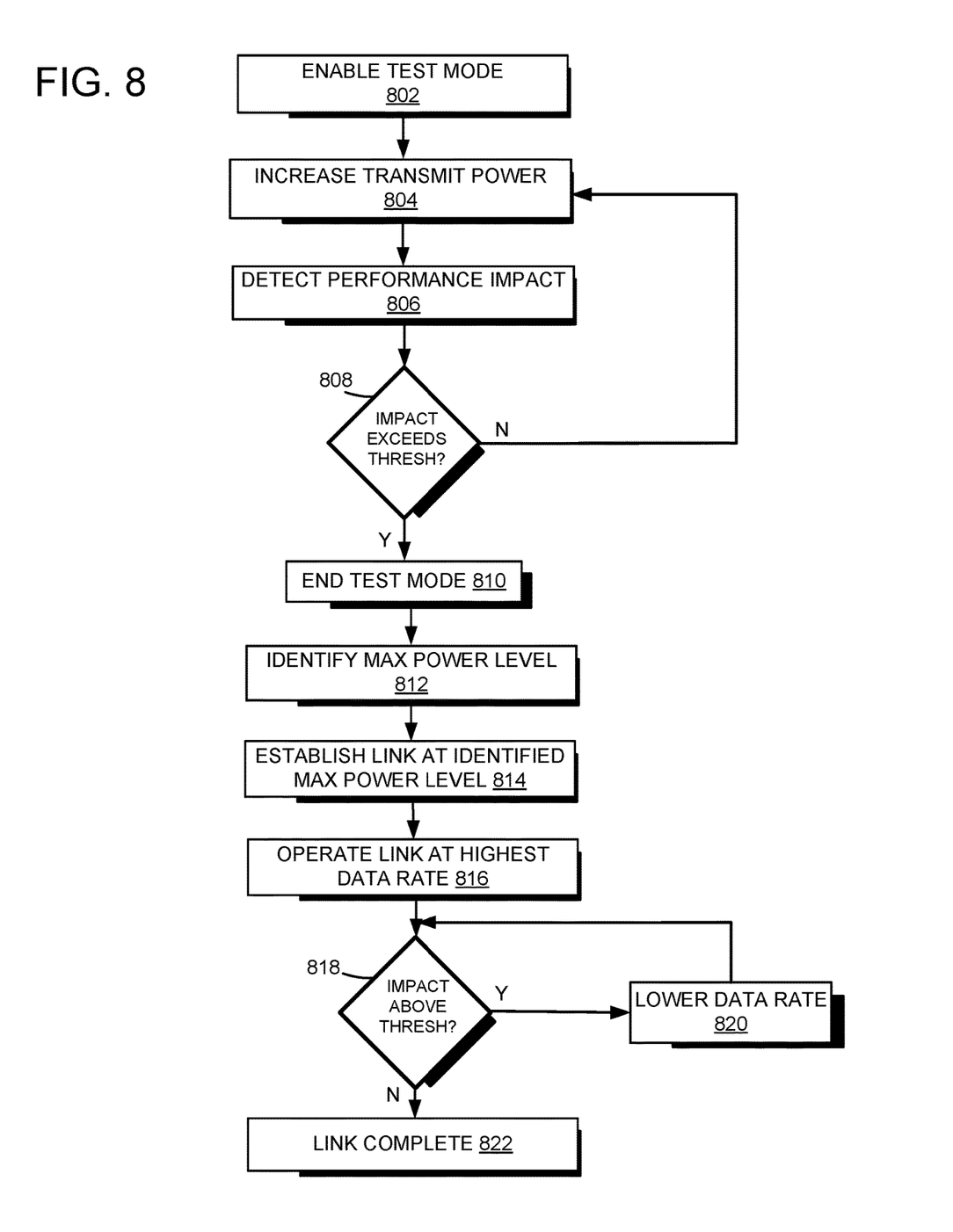
FIGS. 8 and 9 illustrate respective flowcharts for embodiments of a method of establishing a link transmit power setting similar to FIG. 7.

FIG. 8 illustrates a further embodiment of a link test method similar to FIG. 7, but includes steps to avoid any performance impact to existing active channels in the network. In the network switch, software monitors the performance metrics of known neighboring links. During the initialization of a new link, the software enables a test mode for the new link, at 802. The test mode involves gradually increasing the transmit power level of the new PHY, at 804. The test mode ends, at 810, when a detected performance impact, at 806, is determined to meet or exceed a predetermined threshold. A maximum power level is then identified for the new link, at 812. The link may then be established using the determined maximum transmit power level, at 814. For one embodiment, a highest data rate is utilized for the newly initiated link, at 816. If the link fails, at 818, then a lower data rate is utilized, at 820. If the link is successful, at 818, then the link training is complete, at 822.

The embodiment of FIG. 8 has relatively no impact to neighboring channels, and no requirements pertaining to the PHY design.

Figure 9:
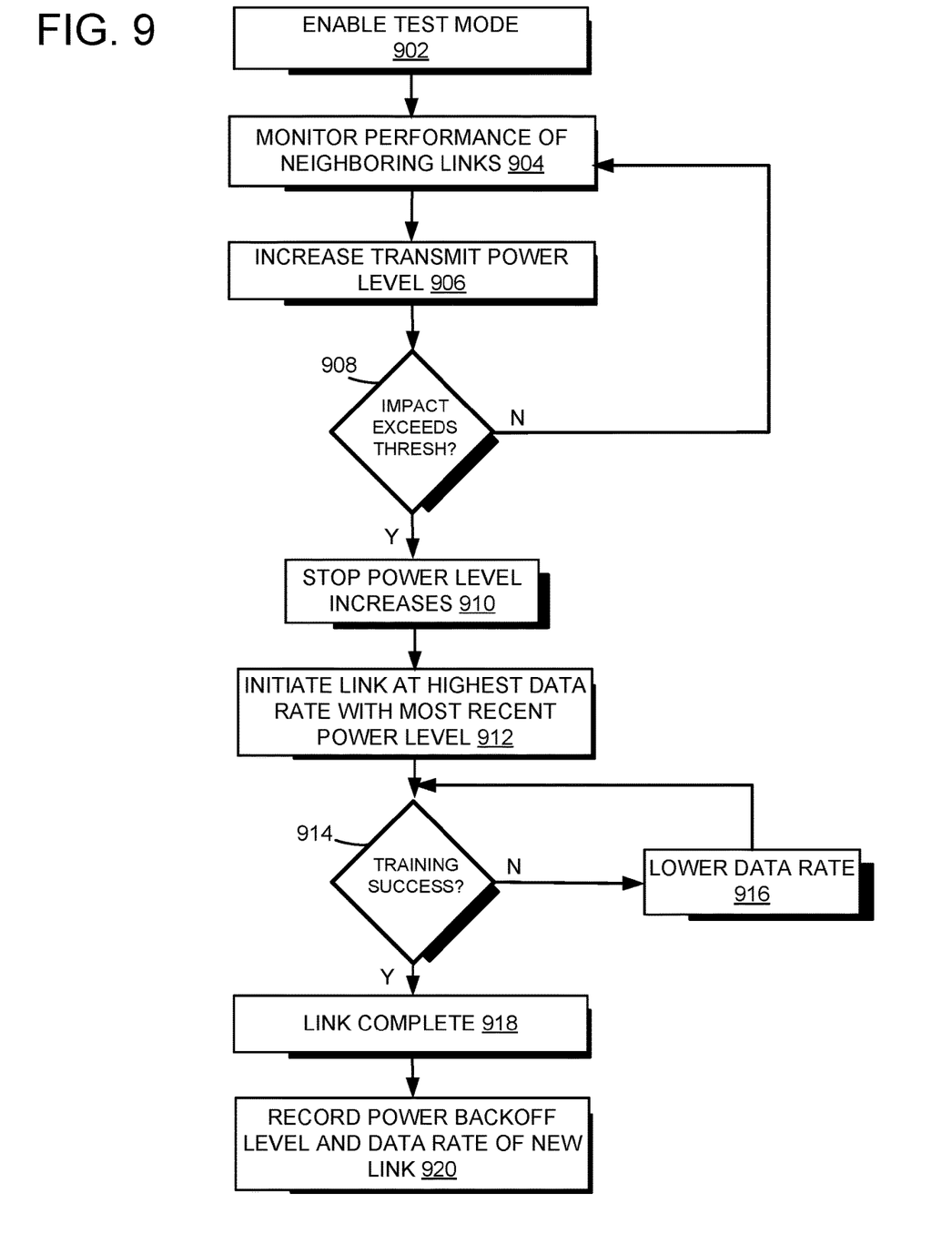

FIG. 9 illustrates a flowchart of a link test method according to a further embodiment that is similar to those described with respect to FIGS. 7 and 8. The method may be employed, for example, when a potential subscriber desires to determine a highest data rate possible from a given service provider (SP). The method begins with the SP enabling a test mode for the target channel (to be added to the network), at 902. Once enabled, the target PHY may then utilize a protocol to enable the test mode and monitor channel conditions of adjacent ports through a shared communication interface such as an MDC/MDIO bus, I2C bus, or other communication channel. The SP monitors the performance metrics of neighboring channels sharing the same cable bundle, at 904. The metrics may involve packet errors, SNR margin, LDPC iteration/average/errors, and power backoff through access to an MDIO interface. The test mode causes the new link PHY to increase a transmit power level for training data at a specific time interval, at 906. The power level adjustment may iteratively continue until an impact to neighboring channels is detected, at 908. If an impact to neighboring channels above a threshold is detected, then a stop command is issued to the PHY, at 910. The PHY then automatically initiates the link at the highest data rate with the last transmit power setting used when the stop command was received, at 912. The PHY then continues training until the training succeeds, which may involve one or more iterations of determining training success, at 914, and data rate downshifting, at 916, if the training is unsuccessful. Once the link is complete, at 918, then the target channel may indicate a "Done" condition, and the service provider may retrieve the results, including recording the power backoff level and data rate of the link at 920. For some embodiments, the service provider may further configure the link PHY to support the maximum data rate and power backoff determined above.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments.

Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than restrictive sense.

We claim:

1. A method of operating an Ethernet transceiver comprising:
   initializing the Ethernet transceiver during a training mode of operation by
      transmitting training data to a link partner over at least one Ethernet link at a first data rate and at a first transmit power level;
      adjusting the data rate and/or transmit power level to an adjusted second data rate and/or second transmit power level based on alien crosstalk feedback indicative of alien crosstalk effects to at least one crosstalk-coupled Ethernet link that exhibits crosstalk caused by the transmitting; and
   initiating operation of the Ethernet transceiver in a normal data transfer mode of operation utilizing the adjusted second data rate and/or adjusted second transmit power level.

2. The method of claim 1, wherein:
   the Ethernet transceiver and the link partner cooperate to define a first Ethernet link; and
   the neighboring Ethernet links are independent of the first Ethernet link.

3. The method of claim 2, wherein:
   the feedback represents one or more measurements of parameter information indicative of actual alien crosstalk.

4. The method of claim 3, wherein:
   the feedback comprises at least one from the group comprising signal-to-noise ratio (SNR), average Low Density Parity Check (LDPC) values, LDPC iteration counts, Cyclic Redundancy Check (CRC) errors, and measured alien crosstalk.

5. The method of claim 1, wherein the adjusting comprises:
   comparing the feedback to a predetermined threshold level; and
   modifying the data rate and/or transmit power level based on the comparing.

6. The method of claim 5, wherein the comparing and modifying further comprises:
   iteratively adjusting the data rate and/or transmit power level based on iterative comparisons of iteratively obtained feedback to the predetermined threshold level.

7. The method of claim 1, wherein:
   the feedback represents detection of an event occurring as a result of alien crosstalk.

8. The method of claim 7, wherein:
   the feedback comprises at least one from the group comprising an indicator of a neighboring link fail and an indicator of a retraining sequence for a neighboring link.

9. An Ethernet transceiver, comprising:
   interface circuitry operative during a training mode of operation to
      transmit training data to a link partner over at least one Ethernet link at a first data rate and at a first transmit power level;
      adjust the data rate and/or transmit power level to an adjusted second data rate and/or second transmit power level based on alien crosstalk feedback indicative of alien crosstalk effects to the at least one crosstalk-coupled Ethernet link that exhibits crosstalk caused by the transmit training data; and
   wherein the interface circuitry operates during a normal data transfer mode of operation to utilize the adjusted second data rate and/or adjusted second transmit power level.

10. The Ethernet transceiver according to claim 9, wherein:
   the Ethernet transceiver and the link partner cooperate to define a first Ethernet link; and
   the neighboring Ethernet links are independent of the first Ethernet link.

11. The Ethernet transceiver according to claim 9, wherein:
   the feedback represents one or more measurements of parameter information indicative of actual alien crosstalk.

12. The Ethernet transceiver according to claim 11, wherein:

the feedback comprises at least one from the group comprising signal-to-noise ratio (SNR), average Low Density Parity Check (LDPC) values, LDPC iteration counts, Cyclic Redundancy Check (CRC) errors, and measured alien crosstalk.

13. The Ethernet transceiver according to claim 9, wherein:
the feedback represents detection of an event occurring as a result of alien crosstalk.

14. The Ethernet transceiver according to claim 13, wherein:
the feedback comprises at least one from the group comprising an indicator of a neighboring link fail and an indicator of a retraining sequence for a neighboring link.

15. A network switch, comprising:
multiple Ethernet ports, each of the multiple Ethernet ports including
  interface circuitry operative during a training mode of operation to
    transmit training data to a link partner over at least one Ethernet link at a first data rate and at a first transmit power level;
    adjust the data rate and/or transmit power level to an adjusted second data rate and/or second transmit power level based on alien crosstalk feedback indicative of alien crosstalk effects to at least one crosstalk-coupled Ethernet link that exhibits crosstalk caused by the transmit training data; and
  wherein the interface circuitry operates during a normal data transfer mode of operation to utilize the adjusted second data rate and/or adjusted second transmit power level.

16. The network switch according to claim 15, wherein:
the Ethernet transceiver and the link partner cooperate to define a first Ethernet link; and
the neighboring Ethernet links are independent of the first Ethernet link.

17. The network switch according to claim 15, wherein:
the feedback represents one or more measurements of parameter information indicative of actual alien crosstalk.

18. The network switch according to claim 17, wherein:
the feedback comprises at least one from the group comprising signal-to-noise ratio (SNR), average Low Density Parity Check (LDPC) values, LDPC iteration counts, Cyclic Redundancy Check (CRC) errors, packet errors, and measured alien crosstalk.

19. The network switch according to claim 15, wherein:
the feedback represents detection of an event occurring as a result of alien crosstalk.

20. The network switch according to claim 19, wherein:
the feedback comprises at least one from the group comprising an indicator of a neighboring link fail and an indicator of a retraining sequence for a neighboring link.

\* \* \* \* \*